United States Patent [19]
Mitsuhashi et al.

[11] 3,801,462
[45] Apr. 2, 1974

[54] PRODUCTION OF BETA-AMYLASE
[75] Inventors: Masakazu Mitsuhashi; Mamoru Hirao, both of Okayama, Japan
[73] Assignee: Hayashibara Company, Okayama, Japan
[22] Filed: Apr. 23, 1971
[21] Appl. No.: 137,026

[30] Foreign Application Priority Data
May 4, 1970  Japan.................................. 45-38142

[52] U.S. Cl.............................................. 195/66 R
[51] Int. Cl............................................... C07g 7/02
[58] Field of Search......... 195/62, 66, 31, 65; 62/70

[56] References Cited
UNITED STATES PATENTS
2,496,261  2/1950  Balls et al. ......................... 195/66 R

OTHER PUBLICATIONS

Takeda et al., Improved Method for Crystallization of Sweet Potato B–amylaser, Chemical Abstracts, Vol. 71, 1969, (p. 31), (119843h), QD1A51.

Balls et al., A Crystalline Protein With B–amylase Activity Prepared from Sweet Potatoes, J. Biol. Chem., Vol. 163, (1946), (pp. 571–572), QP501J7.

Primary Examiner—David M. Naff
Attorney, Agent, or Firm—Browdy & Neimark

[57]  ABSTRACT

Beta-amylase is produced from the waste liquor obtained during the production of batata starch by adjusting the pH of the waste liquor to less than 4.5 to form a precipitate and recovering beta-amylase from the precipitate.

5 Claims, No Drawings

PRODUCTION OF BETA-AMYLASE

The present invention relates to a process to recover beta-amylases from batata (sweet potato) employed for an amylase source.

More particularly, beta-amylases used for saccharification of starch and experimental uses are found extensively in botanical sources, such as soy beans, wheats, barleys, oats, ryes and batata, and are produced by microorganisms, such as Bacillus polymixa and others. The enzymes conventionally employed for industrial applications include germinated barley, i.e. a mixture which possesses as its predominant constituents beta-amylases and alpha-amylases, and wheat bran extract produced by extraction with water as described in the U.S.A. Pat. No. 3449203. Further, amylases for experimental uses have been produced from batata by a complicated process. The inventors investigated the applications for enzymes found in enzymatic sources besides wheat, barley, oats and ryes, i.e. in soy beans and potatoes. Eventually the inventors developed industrial applications of beta-amylases resulting from their discovery of a method to recover beta-amylases specifically from extract solution of batata at ease and with a high yield.

Since batata is produced mainly in Kyushu, one of the major islands of Japan, the contents of beta-amylases present in the typical varieties of batata produced in Kyushu, i.e. Kogane Sengan, Norin Nigo and Fukuwase were measured. The results are listed in Table 1.

Table I

| Variety | Enzymatic activity | pH |
| --- | --- | --- |
| Norin Nigo | 720 units/gram batata | 6.0 |
| Kogane Sengan | 345 units/gram batata | 6.1 |
| Fukuwase | 576 units/gram batata | 5.5 |

Since in the starch factories of Kyushu, batataes are rasped and the obtained starch is washed with water and then separated, the presence of beta-amylases in the waste liquor during the process were investigated, which led to the finding that a considerable amount of enzymes was present in the waste liquor after the separation of starch. The finding was as follows.

| | |
| --- | --- |
| Starch milk immediately after rasping | 280 – 500 units/ml |
| Starch milk prior to centrifuge of starch | 76 – 300 units/ml |
| Waste liquor of the first centrifuge | 80 – 250 units/ml |
| Waste liquor of the second centrifuge | nil |

Since as understandable from the finding that recovery of enzymes from the rasped suspension of batata or from starch washing waste liquor is possible, the inventors investigated methods for the separation and condensation of enzymes from rasped suspension of a variety of batataes.

The inventors investigated rasped suspensions of raw batata and waste liquors from starch processors and studied the mobilities of enzymatic activities, which vary with the change of temperature or pH. Hardly any variation was observed with thermal change. No variation of activity was observed with the change of pH at over 4.75, whereas when the pH dropped lower than 4.5 to 3.7 formation of precipitates was effected. Said precipitates were centrifuged and the total activities of beta-amylases present in the supernatant and precipitate fractions were determined. The results of tests performed at over pH 4.75 indicate that at pH 11 most of the activities was inactivated, whereas when the pH was lower than 10 no variations of activity and liquor were noticed. In some cases of pH lower than 4.5 the activity declined to 95 – 100 %. However, at pH 3.7 the activity hardly decreased, and showed that more than 80 % of the activities were collected in the precipitate fraction.

Table II

| | Rasped suspension | | Acid treatment | | | | | |
| --- | --- | --- | --- | --- | --- | --- | --- | --- |
| | | | Sample Suspended solution | | Supernatant | | Precipitate | |
| Norin Nigo | Activity u/ml | pH | Activity u/ml | Recovery % | Activity u/ml | Recovery % | Activity u/ml | Recovery % |
| A | 333 | 5.9 | 318 | 95 | 6 | 2 | 280 | 85 |
| B | 319 | 6.2 | 306 | 96 | 9 | 3 | 256 | 80 |
| Heat treatment 55°C, 5 hours | 310 | 5.7 | 303 | 98 | 0 | 0 | 294 | 95 |
| Upper portion of batata | 480 | 6.2 | 460 | 96 | 0 | 0 | 394 | 82 |
| Bottom portion of batata | 416 | 5.8 | 392 | 94 | 280 | 70 | 62 | 15 |
| External portion of batata | 478 | 6.0 | 461 | 96 | 15 | 3 | 383 | 80 |
| Internal portion of batata | 480 | 5.9 | 456 | 96 | 410 | 85 | 42 | 9 |
| Kogane Sengan A | 176 | 6.0 | 167 | 95 | 8 | 5 | 142 | 81 |
| Kogane Sengan B | 234 | 6.0 | 220 | 94 | 26 | 11 | 187 | 80 |
| Heat treatment 55°C, 5 hrs. | 197 | 5.5 | 189 | 96 | 20 | 10 | 168 | 85 |
| Upper portion of batata | 174 | 6.0 | 164 | 94 | 26 | 15 | 138 | 79 |

Table II — Continued

| | Rasped suspension | | Sample Suspended solution | | Supernatant | | Precipitate | |
|---|---|---|---|---|---|---|---|---|
| Norin Nigo | Activity u/ml | pH | Activity u/ml | Recovery % | Activity u/ml | Recovery % | Activity u/ml | Recovery % |
| Bottom portion of batata | 226 | 6.0 | 215 | 95 | 181 | 80 | 23 | 10 |
| External portion of batata | 182 | 5.9 | 170 | 93 | 25 | 14 | 137 | 75 |
| Internal portion of batata | 233 | 6.0 | 221 | 95 | 187 | 80 | 23 | 10 |

As the results of tests with Norin Nigo and Kogane Sengan show a slight irregularity, however, by treating the rasped suspension with hydrochloric acid or acetic acid at pH 3.7 80 % of the activity was retained and over 80 % of the activity present in the original rasped suspension was recovered as precipitates. By investigating the irregularities on the enzymatic activities present in various portions of raw batata and the states of the precipitates, the inventors found that the enzymatic activities from only the upper and external portions of batataes were collected in precipitate fraction by the acid treatment, namely that the enzyme was adsorbed and precipitated with unknown ion-active substances, e.g. proteins according to the pH change. Accordingly the inventors discovered from the results of attempting acid treatment on the rasped suspension obtained after heat treating raw potato at a temperature lower than the gelatinization temperature of starch that inactivation by acid treatment of both varieties are low and that the recovery yield of enzymes in precipitates are desirable.

As described above, the method according to the invention to separate enzymes as precipitates by acid treatment of rasped suspension or waste liquors of batata is a very simple and effective process. Accordingly it is of course desirous to achieve most of the purposes of the invention intentionally even by waiting the natural decline of pH of rasped suspension of batata or waste liquors from starch processors by allowing them to be fermented by bacterial infection following standing intact. Therefore even when waste liquors from starch processors are utilized it is advantageous to recover the enzymes from batata by applying the least amount of water to the batata, conducting separation of the condensed extract solution and then lowering their pH.

As described above it is possible to condense most of the enzymes as precipitates by adjusting the pH to lower than 4.5 by adding an organic or inorganic acid to rasped extract of batata or waste liquors from starch processors. Furthermore the inventors discovered that improvement of the yield of enzymes from rasped extract is possible by heat treating raw batata at around 55° C.

Additionally the inventors determined the enzymatic activities of maltases and alpha-amylases which may coexist in said enzymes. The determination resulted in the finding that the activities are hardly present. Accordingly condensation and recovery of highly pure beta-amylases present in batata are possible with ease by a simple pH treatment. Furthermore the inventors established that it is possible to utilize said separated enzymes for industrial saccharification, namely, the enzymes are employable similarly to the extract solution of wheat bran described in the U.S. Pat. No. 3,449,203 in order to produce liquefied starch solutions of low D.E. for production of maltose syrup. In case pure enzymatic proteins are necessary purification of the enzymes is possible by dissolving the enzymes in water and usual methods such as salting out or solvent precipitation or others.

The following examples will further illustrate the embodiment of the invention. All parts and percentages are given by weight, unless otherwise specified.

EXPERIMENTAL

EXAMPLE 1

Norin Nigo batata was rasped with a juicer and there was added to the rasped extract, pulp and the liquor used for washing to give a volume of 3 – 4 times that of the material batata. After intimate agitation the mixture was centrifuged at 3,000 r.p.m. for one minute and the supernatant was collected and used as rasped suspension. The obtained solution was adjusted to pH 3.7 – 3.8 with an addition of acetic acid or 4 N hydrochloric acid, and centrifuged into supernatant and precipitates. To the precipitates was added 10 ml of M/10 acetate buffer (pH 5.0), agitated and then determined for enzymatic activity.

The enzymatic activity of the mixture was 250 units per ml. The total enzymatic activity of the solution, from which pulp was removed, was 680 units per material raw batata. The total enzymatic activity of the precipitates obtained after acid treatment of said solution was 83 % of that the solution.

EXAMPLE 2

Kogane Sengan batata was treated at 55° C for three hours, rasped, and extract juice was obtained by pressing. One part of the juice was washed with 3 parts of water and the mixture equivalent to four times of the weight of the material batata was prepared. From the mixture were removed starch and pulp by centrifuge. The rasped suspension obtained possessed an enzymatic activity of 450 units per material batata. Formation of precipitates was effected by adjusting the suspension to pH 3.5 with an addition of acetic acid. The formed enzymatic proteins were centrifuged, and said enzymes were dissolved with a M/10 acetic acid buffer, pH 5.5, and their activity was determined. The total enzymatic activity of the product was 82 % of that of the rasped suspension.

EXAMPLE 3

Rasped batata extract from a starch processor, which possessed pH of 6.1 and enzymatic activity of 143 units per ml, was centrifuged. The supernatant suspension was adjusted to pH 3.5 – 3.7 with 4 N HCl and allowed to stand for 30 minutes. The formed precipitates were collected by centrifuging and then dissolved with an addition of M/10 acetic buffer solution to pH 5.5. To a liquefied starch solution which was obtained by the addition of liquefied amylase of 0.2 % of starch and heating at 90° C, was added two units of said enzyme per gram starch and incubated at 50° C and pH 6.0 for 10 hours, and thus a sugar solution of D.E. (dextrose equivalent) of 48 was obtained. Said sugar solution was purified activated carbon and ion exchange resins. Similarly as in the case of saccharification of starch with a beta-amylase extracted from wheat bran a colorless and transparent maltose syrup was obtained.

What we claim:

1. A process for separating $\beta$-amylase from the waste liquor obtained during the production of batata starch, said waste liquor comprising an aqueous solution obtained from a rasped suspension of batata including the rasped suspension from the external portion of the batata, comprising:
   adjusting the pH of said liquor to less than 4.5 until a precipitate is formed; and
   recovering the $\beta$-amylase present in said precipitate.

2. A process in accordance with claim 1 wherein said waste liquor comprises an aqueous solution obtained from a rasped solution of batata which has been heat-treated to a temperature lower than the gelatinization temperature of batata starch.

3. A process in accordance with claim 1 wherein said adjusting step is accomplished by the addition of acid.

4. A process in accordance with claim 1 wherein said adjusting step is accomplished by allowing said waste liquor to stand until the pH is lowered by fermentation due to bacterial infection.

5. A process in accordance with claim 1 wherein said pH is adjusted to 3.5 – 3.8.

* * * * *